(12) United States Patent
Siaenen et al.

(10) Patent No.: US 11,192,462 B2
(45) Date of Patent: Dec. 7, 2021

(54) CHARGING STATION FOR ELECTRIC VEHICLES

(71) Applicants: Thorbjörn Siaenen, Dortmund (DE); Christian Müller-Winterberg, Dorsten (DE); Jürgen Waffner, Essen (DE)

(72) Inventors: Thorbjörn Siaenen, Dortmund (DE); Christian Müller-Winterberg, Dorsten (DE); Jürgen Waffner, Essen (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 17/146,899

(22) Filed: Jan. 12, 2021

(65) Prior Publication Data
US 2021/0129692 A1 May 6, 2021

Related U.S. Application Data

(63) Continuation of application No. PCT/EP2019/073221, filed on Aug. 30, 2019.

(30) Foreign Application Priority Data

Sep. 18, 2018 (DE) .................... 10 2018 122 828.7

(51) Int. Cl.
*H02J 7/00* (2006.01)
*H02J 7/14* (2006.01)
(Continued)

(52) U.S. Cl.
CPC ............. *B60L 53/18* (2019.02); *B60L 53/31* (2019.02); *H02G 11/003* (2013.01)

(58) Field of Classification Search
USPC ...................................................... 320/109
See application file for complete search history.

(56) References Cited

U.S. PATENT DOCUMENTS

2011/0074351 A1* 3/2011 Bianco .................. G07F 15/005
320/109
2012/0013300 A1* 1/2012 Prosser ............... B60L 11/1844
320/109
(Continued)

FOREIGN PATENT DOCUMENTS

CN 201 181 832 Y 1/2009
DE 000002448141 C2 11/1986
(Continued)

OTHER PUBLICATIONS

Stecker, Steckdosen, Fahrzeugkupplungen und Fahrzeugstecker—Konduktives Laden van Elektrofahrzeugen—Teil 2: Anforderungen und Ha.uptmaBe fur die Kompatibilitat und Austauschbarkeit van Stiff—und Buchsensteckvorrichtungen fur Wechselstrom (IEC 62196-2); Deutsche Fassung. DIN EN 62196-2 (VDE 0623-5-2), Nov. 2017, pp. 1-65.

*Primary Examiner* — Alexis B Pacheco
(74) *Attorney, Agent, or Firm* — Reinhart Boerner Van Deuren P.C.

(57) ABSTRACT

The application relates to a charging station for electric vehicles, comprising a cable holding device with a cable guided over a first deflection unit and a second deflection unit having two ends for holding two charging cables. The first end of the rope is connected to a first charging cable of the charging station and the further end of the rope is connected to a further charging cable of the charging station. At least one weight element is operatively connected to the rope in such a way that the charging cables in an unused condition of the charging cables are held so that there is a distance between a ground surface and each part of the charging cables.

10 Claims, 3 Drawing Sheets

(51) Int. Cl.
*B60L 53/18* (2019.01)
*B60L 53/31* (2019.01)
*H02G 11/00* (2006.01)

(56) References Cited

U.S. PATENT DOCUMENTS

| | | | | |
|---|---|---|---|---|
| 2012/0048983 | A1* | 3/2012 | Bianco | B60L 11/1818 242/388.9 |
| 2013/0229141 | A1* | 9/2013 | Johnson | B60L 53/31 320/101 |
| 2014/0001300 | A1* | 1/2014 | Ichihara | B60L 53/30 242/388.91 |
| 2016/0089996 | A1* | 3/2016 | Sugiura | B60L 53/16 320/109 |
| 2017/0129355 | A1* | 5/2017 | Fournier | H02G 11/003 |
| 2020/0044481 | A1* | 2/2020 | Soloboev | H02K 7/1807 |
| 2020/0114774 | A1* | 4/2020 | Helnerus | H02G 3/0493 |
| 2020/0180455 | A1* | 6/2020 | Mailloux | B60L 53/30 |

FOREIGN PATENT DOCUMENTS

| | | |
|---|---|---|
| DE | 20 2004 019 308 U1 | 4/2006 |
| DE | 600 38 013 T2 | 2/2009 |
| DE | 10 2015 201 211 A1 | 7/2016 |
| DE | 10 2016 014896 A1 | 6/2018 |
| JP | S57 44096 A | 3/1982 |
| JP | S57-044096 U | 3/1982 |

* cited by examiner

CHARGING STATION FOR ELECTRIC VEHICLES

CROSS-REFERENCE TO RELATED PATENT APPLICATIONS

This patent application is a continuation of International Application No. PCT/EP2019/073221, filed on Aug. 30, 2019, which claims the benefit of priority to German Patent Application No. 10 2018 122 828.7, filed Sep. 18, 2018, the entire teachings and disclosures of both applications are incorporated herein by reference thereto.

FIELD

The application relates to a charging station for electric vehicles, comprising a cable holding device configured to hold two charging cables. The application also relates to a cable holding device for a charging station.

BACKGROUND

In order to promote the operation of electric vehicles, in particular, electrically powered cars, but also other vehicles, the transport infrastructure is increasingly being equipped with charging stations. Known charging stations can comprise at least one plug receiver into which a charging plug of a charging cable can be inserted by a user.

Alternatively or additionally, charging stations can comprise at least one fixed charging cable having a (fixedly connected) charging connector, in particular, in the form of a charging plug. The charging connector corresponds to a charging connector of the electric vehicle. In particular, a charging plug can be inserted into a plug receiver of the electric vehicle. The charging plug of the charging cable can preferably be a type 2 charging plug according to the standard IEC 62196-2. It goes without saying that other charging connectors can also be used.

FIG. 1 shows a charging station 100 according to the prior art. The shown charging station 100 comprises a (charging) column 144, which is arranged on a foundation 142, having a (charging) head 146. The shown charging station 100 comprises a first charging cable 134 and a second charging cable 138. Each charging cable 134, 138 comprises a free end 136, 140 formed by a charging connector 136, 140 in the form of a charging plug 136, 140. The other end of each charging cable 134, 138 can be permanently connected to a charging device (not shown).

The charging device may have components/charging technology in a conventional way to allow a specific current flow from a (not shown) power source (e.g. a public power grid) via a charging cable to charge (or discharge) an electrically driven vehicle and its electrical energy storage device, respectively.

In addition, the charging station 100 comprises a cable holding device 102. The cable holding device 102 comprises two ropes 104, 110, four deflection units 116, 118, 120, 122 and two weight elements 124, 126. One weight element 124, 126 each for one rope 104, 110.

As further shown in FIG. 1, the first end 106 of the first rope 104 is connected to the first charging cable 134 and the further end 108 of the first rope 104 is connected to a first suspension 148, which is fixed, in particular, in the charging column head 146. In the same way, the first end 112 of the further rope 110 can be connected to the further charging cable 138 and the further end 114 of the further rope 110 can be connected to a further suspension 150, which is also located in the loading column head 146.

The first rope 104 is guided by a first deflection unit 116 in the direction of a ground surface 128 and in the direction of the foundation 142, respectively, and by a third deflection unit 120 in the opposite direction to the suspension 148. A corresponding run is provided for the further rope 110.

In addition, each rope 104, 110 is operatively connected to at least one weight element 124, 126. In particular, each rope 104, 110 is tensioned by the respective weight element 124, 126. This ensures that when a charging cable 134, 138 is not in use, it is held in such a way that there is a specific distance, in particular, a minimum distance, between the ground surface 128 and each part of the charging cable 134, 138. This is, in particular, the case if there is a specific distance, in particular, a minimum distance, between the ground surface 128 and the free end 136, 140 of the charging cable 134, 138, here the charging connector 136, 140 (which is usually attached to the end of the charging cable 134, 138) of the charging cable 134, 138.

In other words, the cable holding device 102 having the two ropes 104, 110 provides for that the two charging cables 134, 138 with the charging connectors 136, 140 do not lie on the ground when no vehicle is connected. In addition, the cable holding device 102 provides for that there is a distance between the ground surface 128 and each part of the charging cable 134, 138 also when the charging cable is connected, i.e. in a used state, i.e. when the charging plug 136, 140 is coupled to a (not shown) vehicle plug receiver (socket).

In order to connect a charging plug 136, 140 to a (not shown) vehicle plug receiver, the rope (cable) can be pulled out at least partially by a user during use.

For safety reasons and to limit the way in the vertical direction, each weight element 124, 126 is also provided with an associated stop element 130, 132. As a general rule, a (not shown) partition wall is also provided between the two weight elements 124, 126 to prevent a collision of the two weight elements 124, 126 during the operation.

A disadvantage of such a known charging station is that the cable holding device is complex. A large number of components (ropes, weights, suspensions, stop elements, partition wall, etc.) are required. With the increased expenditure of an appropriate cable holding device for holding two charging cables, the costs are correspondingly higher.

BRIEF SUMMARY

Therefore, the object of the present application is to provide a charging station with a cable holding device that allows for holding two charging cables in a simpler way.

According to a first aspect of the application the object is solved by a charging station for electric vehicles according to claim 1. The charging station comprises a cable holding device with a rope with two ends for holding two charging cables, wherein the rope is guided over a first deflection unit (element) and a second deflection unit (element). The first end of the rope is connected to a first charging cable of the charging station and the further end of the rope is connected to a further charging cable of the charging station. The charging station comprises at least one weight element operatively connected to the rope in such a way that the charging cables are held in an unused state of the charging cables so that there is a distance between a ground surface and each part of the charging cables.

Contrary to the state of the art, according to the application only a single rope with a single weight element is provided for holding two charging cables. In other words, it is provided in the application that the two ropes of the state of the art become one rope and that only one weight element is hung from this rope. A second rope, suspensions for two ropes and a second weight element can be omitted. A holding of two charging cables of a charging station is made possible in a simpler way and, in particular, in a more cost-effective way. A further essential advantage of the charging station according to the application is that a collision of two weight elements does not have to be prevented by a partition wall or the like.

The charging station according to the application comprises at least two charging cables. It shall be understood that the charging station may include three or more charging cables and, for example, two cable holding devices according to the application. Preferably, the first charging cable and the further charging cable are firmly connected to a charging device of the charging station. A fixed connection means, in particular, that a user cannot disconnect the charging cable from the charging device without damaging it.

The charging device may have components in a conventional way to enable a specific current flow from a power source (e.g. a public power grid, energy generator, etc.) via the charging cable to charge an electrically driven vehicle and its electrical energy storage device, respectively. The charging device can be integrated in a charging column or formed as a "wallbox". In particular, the charging device can be a part of the charging station. The charging device, in particular, the components and the charging technology, respectively, can also be integrated into a wall or floor. It goes without saying that a bidirectional current transmission and power transmission, respectively, can be made via the charging cables and the charging technology of the charging device.

The charging station comprises at least one cable holding device. The cable holding device is at least formed by a rope and a first deflection unit and a second deflection unit. A deflection unit is, in particular, a unit that guides the rope and deflects it from a first direction to another direction that is different from the first direction. Preferably, a deflection unit can be a pulley.

The first end of the rope is connected (directly or indirectly) to the first charging cable to hold the first charging cable. In contrast to the state of the art, the further end of the rope is not connected to a suspension, but is connected (directly or indirectly) to the further charging cable, in particular, to hold the further charging cable. In other words, according to the application two charging cables are held by the same rope.

The cable holding device is, in particular, configured to hold the two charging cables in each case at one suspension point (in an unused state of the charging cable). A suspension point is, in particular, the connection point where a charging cable is connected to one end of the rope. It shall be understood that in variants of the application at least one intermediate piece may be provided to connect one end of the rope to a charging cable and to fix the end of the rope, respectively, to the charging cable. In this case, a suspension point is understood to be in particular the connection point where a charging cable is connected to one end of the intermediate piece.

Here it is preferably provided that the cable holding device is formed in such a way that the distance between a suspension point and a ground surface (in an unused state of the corresponding charging cable) is at least larger than the distance of an electric charging connection of an electric vehicle to be charged to the (reference) ground surface. In particular, the ground surface can be a surface on which an electric vehicle to be charged is arranged to charge said vehicle. Preferably the distance between a suspension point and the ground surface (in an unused state of the corresponding charging cable) is at least 1.5 m, preferably between 2 m and 3.5 m.

In order to hold a charging cable in an unused state and an untensioned state, respectively, (when the cable is not extended) so that there is a distance between the charging cable, in particular, the free end of the charging cable, and a ground surface, the cable holding device comprises a (single) weight element. The weight element can be formed in one piece or composed of a plurality of weight modules. The weight element is designed to tension the rope. In particular, the weight element has an operative connection with the rope in such a way that the rope is tensioned so that the first charging cable is held in an unused state of the first charging cable and the second charging cable is held in an unused state of the second charging cable in such a way that there is (always) a (specific) distance between a ground surface and each part (cable, charging connector, handle, etc.) of the respective charging cable, in particular, the respective free end of the charging cable. In other words, by the operative connection according to the application between the rope and the weight element it is ensured that the charging cables do not touch the ground surface (e.g. a road or parking lot surface) in an unused (and, in particular, also in a used) state. A minimum distance between the point of the charging cable that is closest to the ground surface in an unused state (in particular, the free end of the charging cable) and the ground surface can always be ensured by the operative connection in accordance with the application.

In addition to an improved handling by the user, it is achieved that damage and/or soiling of the charging cable due to contact with the floor surface is avoided. In addition, it is made possible that the charging cable can be fed to the charging plug from above without having to bend the charging cable.

In addition, the cable holding device can optionally comprise a stop element to limit the path of the weight element in the direction of the foundation. In particular, the stop element can be a damping element to reduce impulse-like loads.

A charging cable of the charging station according to the application can have a diameter between 20 mm and 80 mm, preferably between 40 mm and 60 mm. The larger cross section allows the transmission of larger charging currents (between 0 A and 500 A) and larger power (between 20 kW and 500 kW (with a diameter up to 60 mm), respectively.

The free end of a charging cable is formed, in particular, by a charging connector, which corresponds to a charging connector of an electric vehicle. The charging connector of the charging cable can preferably be a charging plug, in particular, a type 2 charging plug according to the standard IEC 62196-2.

According to a first embodiment of the charging station according to the application, the cable holding device can be a gallows holding device. A gallows holding device and gallows suspension, respectively, provides a safe suspension for the two charging cables. At the same time an easy handling and movability of the charging cable can be provided. This guarantees a user-friendly insertion of a charging plug into a plug socket of a vehicle.

In addition, the rope can, according to a preferred embodiment of the charging station according to the application, be guided over at least a third deflection unit arranged between the first deflection unit and the second deflection unit. At the third deflection unit the weight element can be attached. Preferably, the third deflection unit can be a (deflection) pulley to which the weight element can be attached (via a connecting element) for tensioning the rope. In a simple way, an operative connection between the rope and the weight element can be provided.

Preferably, the at least one third deflection unit may be vertically spaced from the first deflection unit and from the second deflection unit. In particular, the distance between the ground surface and the foundation, respectively, and the third deflection unit may be smaller than the distance between the ground surface and the foundation, respectively, and the first deflection unit and the distance between the ground surface and the foundation, respectively, and the second deflection unit.

According to a further embodiment of the present charging station, the rope can run from the first end (of the rope) via the first deflection unit, the third deflection unit and the second deflection unit to the further end (of the rope). In particular, the rope can be guided via the first deflection unit and the second deflection unit in the direction of the ground surface and the foundation, respectively.

In particular, in order to increase the extendable length of a charging cable, at least one further third deflection unit and at least one fourth deflection unit for at least one further deflection of the rope may be provided in accordance with a preferred embodiment of the charging station according to the application. The fourth deflection unit may be vertically spaced from the third deflection units. In particular, the distance between the ground surface and foundation, respectively, and the further third deflection unit may be smaller than the distance between the ground surface and foundation, respectively, and the fourth deflection unit.

The rope and the at least two deflection units, preferably, the at least three deflection devices, are arranged, in particular, in such a way that a pulley system is formed.

In accordance with a further embodiment of the charging station according to the application, the charging station can comprise a foundation (and a stand, respectively), a (charging) column (and housing, respectively) arranged on the foundation and a (column) head (and column cover, respectively) arranged on the column. The first deflection unit and/or the second deflection unit can preferably be located in the column head. The rope can be led out through two openings in the column head. Preferably, an optional fourth deflection unit can also be arranged in the column head.

The at least one third deflection unit can be located in the column, preferably in the lower half of the column, in particular preferably in a lower third of the column (seen from the ground surface and foundation, respectively).

In addition, it has been recognized that preferably the weight element can be dimensioned at least depending on the number of deflection units, wherein, in particular, the weight element is the heavier the larger the number of deflection units. In this way a sufficient tension for the rope can always be provided.

As already described, an unused state of a charging cable means, in particular, that no external force (e.g. by a user or due to a coupling of the charging connectors of the charging cable with a charging connector of a vehicle) is exerted on the charging cable in this state (condition). In accordance with a further embodiment of the charging station according to the application, in a used state of a charging cable, the cable may be at least partially extended in such a way that a charging connector of a charging cable may be connected to a further charging connector of the electric vehicle to be charged. In particular, a charging cable can be pulled out and pulled up, respectively, by a user.

A further aspect of the application is a cable holding device for a charging station, in particular, a charging station described above, wherein the cable holding device is configured to hold two charging cables of the charging station. The cable holding device comprises a rope with two ends, which is guided over a first deflection unit (element) and a second deflection unit (element) to hold the two charging cables. The first end of the rope is connectable to a first charging cable of the charging station and the further end of the rope is connectable to a further charging cable of the charging station. The cable holding device comprises at least one weight element operatively connected to the rope in such a way that the charging cables are held in an unused state of the charging cables so that there is a distance between a ground surface and each part of the charging cables.

The cable holding device may, in particular, be used together with a charging station, wherein the charging station may have two charging cables to be held and a charging device as described above.

The features of the charging station and the cable holding device can be freely combined. In particular, features of the description and/or the dependent claims, even by completely or partially circumventing features of the independent claims, may be independently inventive, either alone or freely combined with each other.

There are now a plurality of possibilities to design and further develop the charging station according to the application and the cable holding device according to the application. For this purpose, reference is made on the one hand to the patent claims subordinate to the independent patent claims, and on the other hand to the description of embodiments in connection with the drawing.

BRIEF DESCRIPTION OF THE DRAWINGS

In the drawing shows.

DETAILED DESCRIPTION

In the figures, the same reference signs are used for similar elements.

Figure 1:
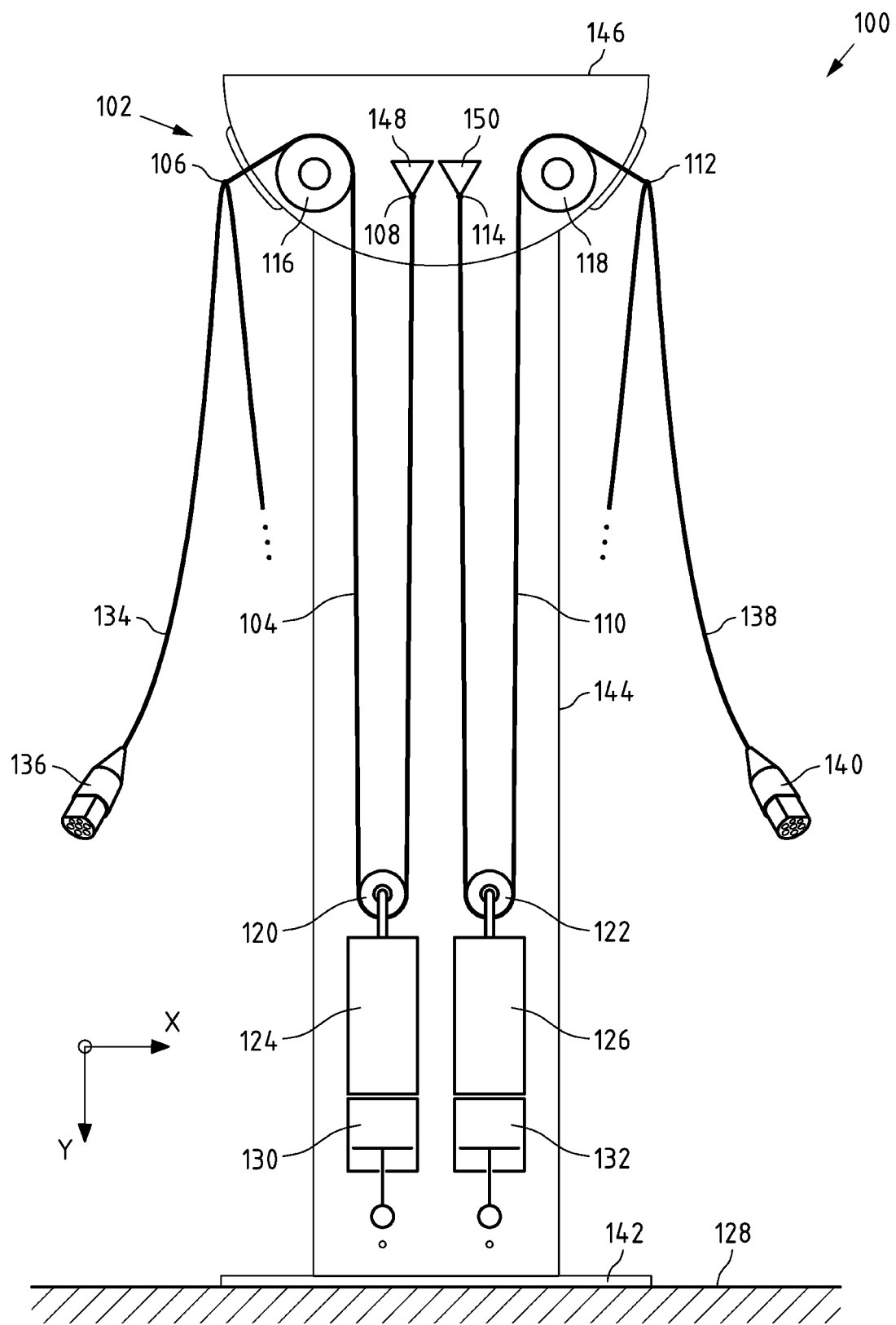
FIG. 1 a schematic view of a charging station according to the state of the art,
FIG. 2 a schematic view of an embodiment of a charging station in accordance with the present application with an embodiment of a cable holding device in accordance with the present application, and
FIG. 3 a schematic view of a further embodiment of a charging station in accordance with the present application with an embodiment of a cable holding device in accordance with the present application.
Figure 2:
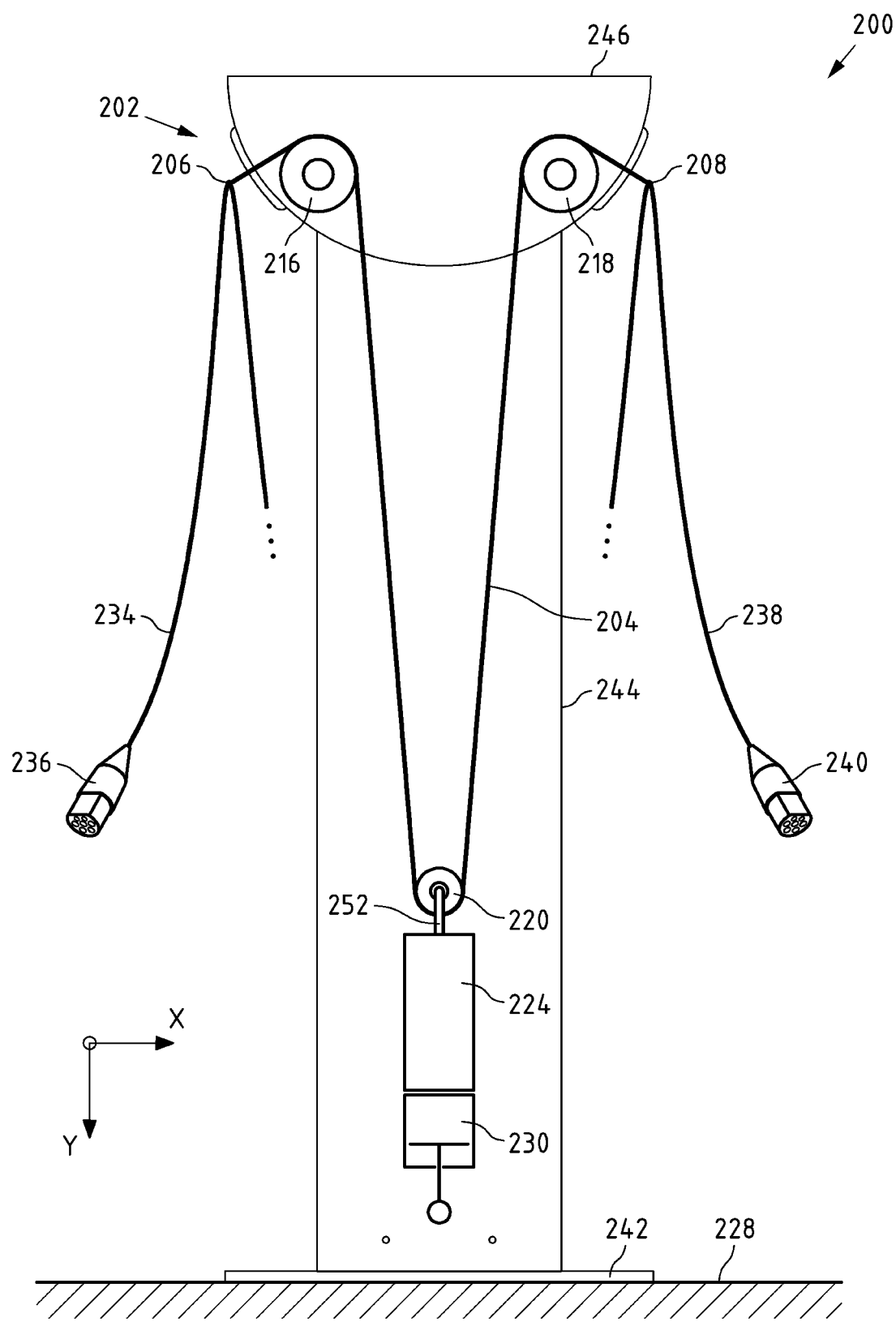

FIG. 2 shows a schematic view of an embodiment of a charging station 200 according to the present application. The charging station 200 includes an embodiment of a cable holding device 202 according to the present application.

The cable holding device 202 is configured to hold two charging cables 234, 238. The cable holding device 202 according to the application is characterized by the fact that in contrast to the state of the art only one rope 204 and one weight element 224 are used to hold two charging cables 234, 238.

In particular, the shown charging station 200 comprises a foundation 242 extending in a horizontal plane (along the x-axis). A column 244 extending in a vertical direction (y-axis) is arranged on the foundation 242 and ends with a column head 246. Preferably inside the column 244 a (not shown) charging device can be arranged, to which the (schematically shown) charging cables 234, 238 can be firmly connected.

The charging device can be electrically connected to a (not shown) power source, in particular, a public power grid. The charging device may include components, in particular, charging technology (e.g. electrical switches, electrical safety units, electrical measuring units, control units, etc.), in order to enable charging of (not shown) electrically operated vehicles, in particular, the electrical energy storage devices of electric vehicles.

The cable holding device 202 is, in particular, formed as a gallows cable holding device 202 to hold the charging cables 234, 238. As can be seen in FIG. 2, the first end 206 of the rope 204 is directly connected to the first charging cable 234. The rope 204, seen from its first end 206, is guided over the first deflection unit 216 in the direction of the ground surface 228 and the foundation 242, respectively, up to a third deflection unit 220 which deflects the rope and guides it in the direction of the head 246 to the second deflection unit 218. The further end 208 of the rope 204 is connected (directly) to the further charging cable 238. An indirect connection can also be provided.

The deflection units 216, 218, 220 are formed, in the present example, as deflection pulleys 216, 218, 220. The first deflection unit 216 and the second deflection unit 218 are arranged in the same horizontal plane and are located in the column head 246. The rope 204 can be led out of the head 246 through openings.

The shown third deflection unit 220 is arranged in the lower half of column 244 (in the shown unused state and unextended state, respectively, of the charging cables 234, 238). If the rope 204 is pulled out during a used state and an extended state, respectively, the third deflection unit 220 moves in the direction of the column head 246.

In addition, the cable holding device 202 comprises a weight element 224 which is connected to the rope 204 via the third deflection unit 220, i.e. it is in operative connection with the rope 204. The weight element 224 is operatively connected to the rope 204 in such a way that the charging cables 234, 238 are held in an unused (and in a used) state of the charging cables 234, 238 in such a way that there is (always) a distance between the ground surface 228 and each part of the charging cables 234, 238. In particular, there is a distance between the free end 236, 240 of the charging cables and the ground surface 228.

In order to limit the path of the weight element 224 in the direction of the ground surface 228, an optional stop element 230 is provided. Preferably, the stop element 230 can be formed as damping element 230. In the present embodiment, this provides for that in an unused state the charging cables 234, 238 adopt a defined state in which the charging cables 234, 238 do not touch the ground surface 228. It shall be understood that in other variants of the application a stop element 230 can also be omitted if the weight element 224 and the charging cables 234, 238 are balanced accordingly.

The weight element 224, which is preferably formed in one piece, but can also be composed of a plurality of weight modules (for example for optimum dimensioning of the weight element 224), is connected, in particular, via a connecting element 252 to the third deflection unit 220.

In other words, the rope 204 is attached to a charging cable 234, 238 with its two ends 206, 208. The rope 204 is led down via one deflection device 216, 218 in each case and is connected to a weight 224 via a third deflection unit 220. In particular, a pulley system is provided by this.

The main advantage is that a collision of two weights does not have to be prevented by a partition wall and a large number of other components are not required.

In variants of the application it can happen that, for example, the left side of the rope can only be pulled out to the maximum if the right side of the rope is not pulled out at all. However, the extendable length can be adapted by appropriate dimensioning of the cable holding device 202 in such a way that the user can connect both charging cables 234, 238 in a user-friendly manner even if both charging cables 234, 238 are in a used and, in particular, at least partially extended state.

Figure 3:
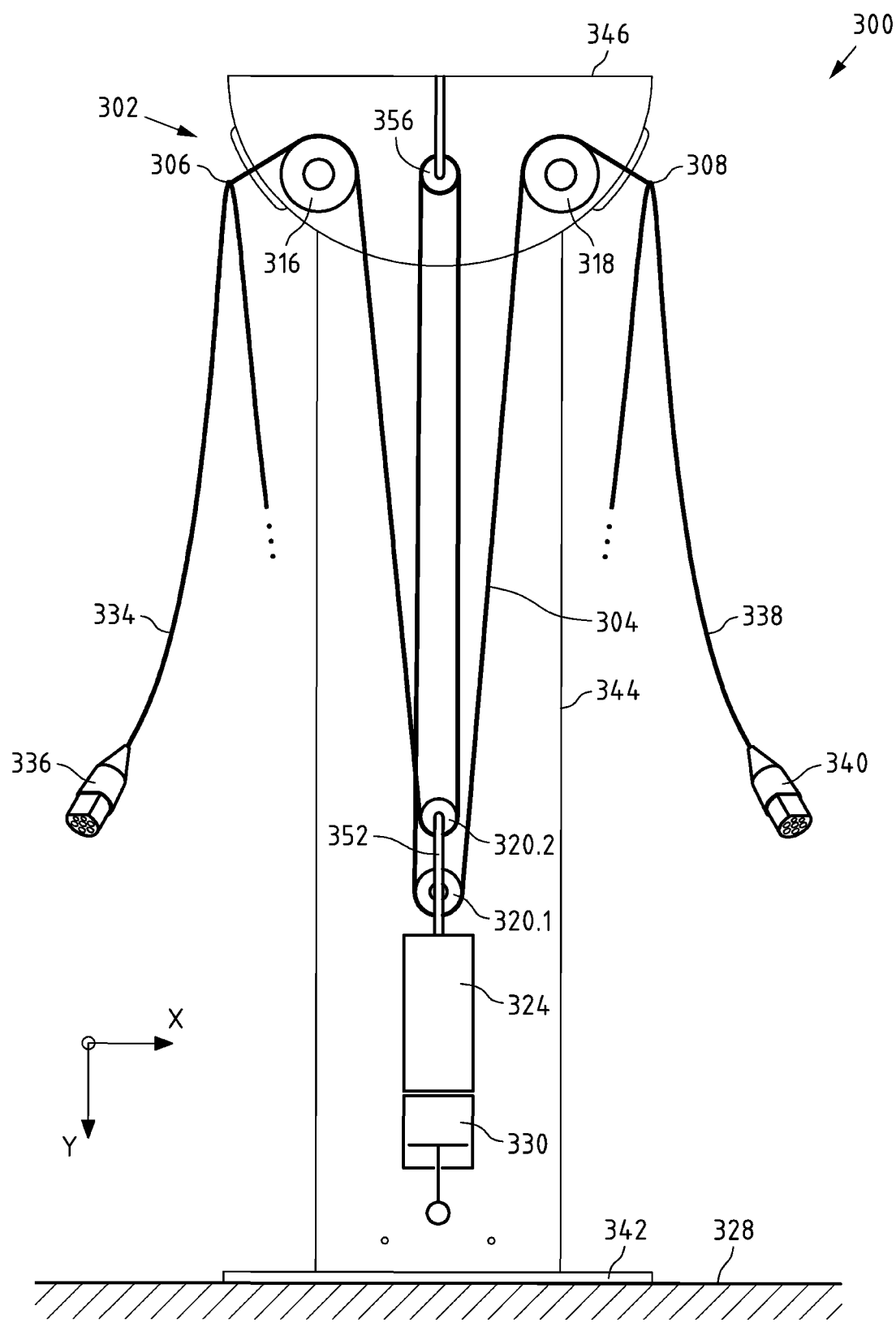

FIG. 3 shows a schematic view of a further embodiment of a charging station 300 according to the present application. In order to avoid repetition, only the differences to the embodiment of the charging station 200 according to FIG. 2 are explained below. Otherwise, reference is made to the above explanations.

As shown in FIG. 3, the shown embodiment of the cable holding device 302 comprises a first third deflection unit 320.1, a further third deflection unit 320.2 and a fourth deflection unit 356. The fourth deflection unit 356 is arranged in the head 346 of the charging station 300, while the third deflection units 320.1, 320.2 are positioned in the column 344 of the charging station 300, in particular, in the lower half of the column 344.

The rope 304, seen from its first end 306, runs down via the first deflection unit 316 in the direction of the foundation 342 to the third deflection unit 320.2. From this third deflection unit 320.2, the rope 304 runs in the direction of the head 346 to the fourth deflection unit 356. From this fourth deflection unit 356, the rope 304 runs down in the direction of the foundation to the third deflection unit 320.1 and from this third deflection unit 320.1 in the direction of the head 346 to the second deflection unit 318 and to the further charging cable 338.

The present embodiment of the charging station has the advantage that due to the larger number of deflection units 316, 318, 320.1, 320.2, 356, a longer rope 304 can be used (compared to the rope 204, i.e. assuming the same dimensions of column 244 and 344). In this way, the maximum extension distance can be increased (in comparison to the embodiment in FIG. 2).

However, the weight of the weight element 324 may be heavier (in comparison to the embodiment shown in FIG. 2). The pulley system thus formed can be extended by further (third and fourth) deflection units in other variants of the application so that the maximum extension length of a rope is increased even further.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A charging station for electric vehicles, comprising:
   a cable holding device having a rope with two ends for holding two charging cables, wherein the rope is guided over a first deflection unit and a second deflection unit,
   wherein the first end of the rope is connected to a first charging cable of the charging station and the further end of the rope is connected to a further charging cable of the charging station, and
   at least one weight element operatively connected to the rope in such a way that the charging cables are held in an unused state of the charging cables so that there is a distance between a ground surface and each part of the charging cables.

2. The charging station according to claim 1, wherein the cable holding device is a gallows holding device.

3. The charging station according to claim 1, wherein
   the rope is guided over at least one third deflection unit arranged between the first deflection unit and the second deflection unit,
   wherein the at least one weight element is fixed to the third deflection device.

4. The charging station according to claim 3, wherein
   the rope runs from the first end via the first deflection unit, the third deflection unit and the second deflection unit to the further end,
   wherein, in particular, the rope is guided via the first deflection unit and the second deflection unit in each case in the direction of the ground surface.

5. The charging station according to claim 3, wherein
   at least one further third deflection unit and at least one fourth deflection unit is provided for at least one further deflection of the rope,
   wherein the fourth deflection unit is vertically spaced from the third deflection units.

6. The charging station according to claim 1, wherein the rope and the at least two deflection units form a pulley system.

7. The charging station according to claim 1, wherein
   the charging station comprises a foundation, a column arranged on the foundation and a head arranged on the column,
   wherein the first deflection unit and/or the second deflection unit is/are arranged at the head.

8. The charging station according to claim 1, wherein
   the at least one weight element is dimensioned at least depending on the number of deflection units,
   wherein, in particular, the at least one weight element is the heavier, the larger the number of deflection units.

9. The charging station according claim 1, wherein in a used state of a charging cable the rope is at least partially extended in such a way that a charging connector of the charging cable can be connected to a further charging connector of the electric vehicle to be charged.

10. A cable holding device for a charging station according to claim 1 for holding two charging cables of the charging station, the cable holding device comprising:
    a rope having two ends for holding the two charging cables, wherein the rope is guided over a first deflection unit and a second deflection unit,
    wherein the first end of the rope is connectable to a first charging cable of the charging station and the further end of the rope is connectable to a further charging cable of the charging station, and
    at least one weight element operatively connected to the rope in such a way that the charging cables are held in an unused state of the charging cables so that there is a distance between a ground surface and each part of the charging cables.

* * * * *